Figure 1:
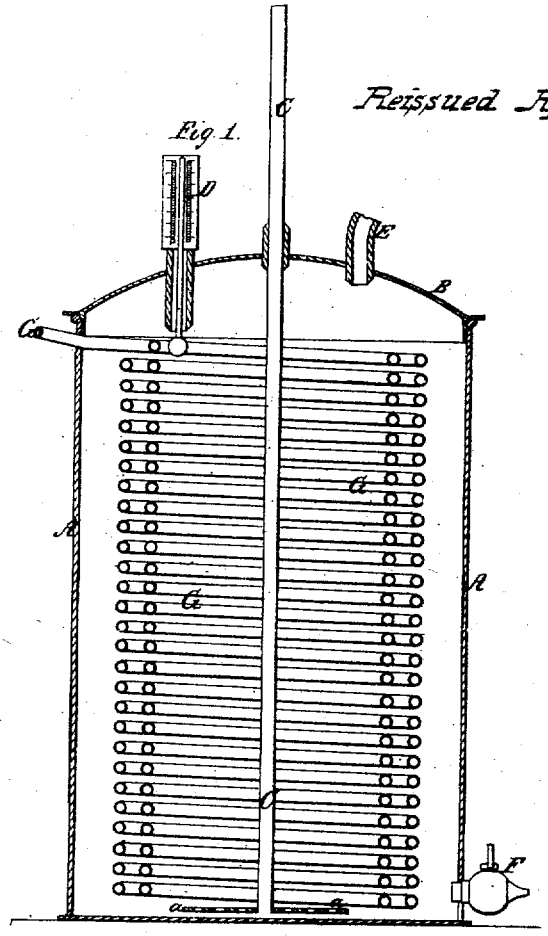

A. Nobel,

Explosive Compound.

No. 2,538. Reissued Apr. 2. 1867.

Witnesses;
Wm. Albert Seitl
J. H. Harris Hydrum

Inventor,
A. Nobel
per his Atty
H. Howson

UNITED STATES PATENT OFFICE.

THE UNITED STATES BLASTING-OIL COMPANY, OF NEW YORK, N. Y., ASSIGNEES OF ALFRED NOBEL.

IMPROVED PROCESS OF PRODUCING AN EXPLOSIVE COMPOUND.

Specification forming part of Letters Patent No. 57,175, dated August 14, 1866; reissue No. 2,538, dated April 2, 1867.

DIVISION B.

*To all whom it may concern:*

Be it known that ALFRED NOBEL, of the city of Hamburg, invented a new Explosive Compound, for which Letters Patent of the United States were granted to him on the 14th day of August, A. D. 1866; and we do hereby declare the following to be a full, clear, and exact description of that part of the said invention which relates to the mode or process of making the said compound.

The invention of the said ALFRED NOBEL consists of the mode or process described hereafter of mixing together glycerine, sulphuric acid, and nitric acid, free, or nearly free, from hyponitric acid, thereby producing nitrine or crystallizing nitro-glycerine, which will not decompose, but may be solidified at a moderate temperature, and may be transported and used with greater safety than ordinary nitro-glycerine.

The essential physical property which distinguishes the said nitrine or crystallizing nitro-glycerine from the nitro-glycerine discovered by Sobrero, and described in chemical works, is that the former passes into a solid form when exposed to a moderate temperature, its melting-point being at 55° Fahrenheit, or thereabout, according to its purity, while the ordinary nitro-glycerine, as stated in chemical works, has been subjected to a cold below the zero of Fahrenheit without losing its liquid state, and has in fact been known for twenty years without ever having been obtained in a solid form. The essential difference in the preparation between the said nitrine or crystallizing nitro-glycerine and the nitro-glycerine previously discovered is that the latter is obtained when fuming nitric acid is used in the operation, whereas the preparation of the former requires a nitric acid free, or comparatively free, from hyponitric acid. The complete distinction between the two compounds is proved by the fact that when crystallized nitro-glycerine is made with a nitric acid but little charged with hyponitric acid a small quantity of the non-crystallizing nitro-glycerine is obtained, which remains liquid, while the crystallizing nitro-glycerine passes into a solid state. Another distinction is that the crystallizing nitro-glycerine is not liable to decomposition, and, after being properly washed, does not present any acid reaction, whereas the ordinary nitro-glycerine, as clearly stated in chemical works, decomposes of itself and deposes oxalic salts.

In order to enable others to make and use, for explosive purposes and in the useful arts, the said compound, we will now proceed to describe some of the modes of manufacturing and using it. On reference to the accompanying drawing, which forms a part of this specification—

Figure 2:
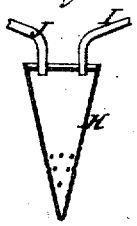
Figure 3:
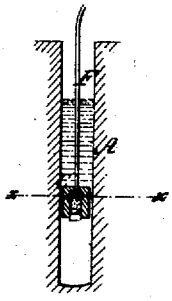
Figure 4:
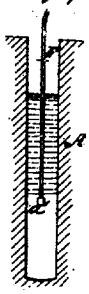
Figure 5:
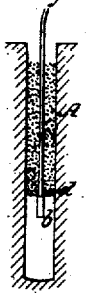

Figure 1 is a sectional elevation of apparatus which may be used for manufacturing the crystallizing nitro-glycerine; Fig. 2, a sectional elevation of another apparatus; Figs. 3, 4, and 5, views which illustrate different modes of exploding the crystallizing nitro-glycerine.

On reference to Fig. 1, A is a vessel of lead, stoneware, or other material which will not be injuriously affected by the action of sulphuric or nitric acid. To this vessel is fitted a cap, B, through an opening in the center of which slides a rod, C, and to the lower end of the latter is secured a perforated disk or dasher, *a*. Through the cap B extends the stem of the thermometer D, the bulb of which is immersed in the liquid in the vessel, and near the opposite edge of the cap projects a pipe, E, which communicates with a reservoir containing a supply of glycerine. The rod or dasher should be made of iron and covered with lead. At the lower end of the vessel is a cock, F, and within the vessel is a leaden coil or worm, G, through which is maintained a constant circulation of cold water.

The operation of this apparatus is as follows: The vessel A is filled, or nearly filled, with a mixture of about two parts of strong sulphuric acid and about one part of nitric acid, free from, or but little charged with, hyponitric acid. A spigot in the tube E is then opened and glycerine admitted gradually, in about the proportion of one part to eight parts of the said mixed acids. The thermometer D serves to show the temperature of the mixture, which may be regulated by the admission of more or less glycerine to the vessel.

During the above operation the mixing apparatus or dasher *a* is moved up and down to thoroughly agitate the liquids and produce a complete mixture. When the operation is finished the contents of the vessel are withdrawn through the cock F and permitted to flow into a tank of water, the nitro-glycerine sinking in a short time to the bottom of the tank, from which it is withdrawn, and then thoroughly washed by agitating it with water in any suitable vessel. The acids which remain in the water after the nitrine is withdrawn are concentrated for subsequent use by any of the ordinary processes used for concentrating sulphuric acid. Although we prefer the use of the cooling-coil G, it may be dispensed with, if desired.

In place of the apparatus just described, that shown in Fig. 2 may be used. This apparatus consists of a funnel-shaped perforated vessel, H, over the top of which extend the ends of two pipes, I J, one communicating with a reservoir containing glycerine, and the other with the reservoir containing the mixture of acids before described, the reservoirs being situated at such a height above the vessel H that their contents may flow through the pipes with considerable force. The liquids are discharged in proper proportions into the vessel H, where they are thoroughly intermixed by the junction of two forcible streams, the mixture flowing through the perforations of the vessel into a tank of water below.

There are several modes of exploding the nitro-glycerine, some of which are shown in Figs. 3, 4, and 5. In Fig. 3, A represents the rock, in which is drilled a hole, and into the latter is poured sufficient nitrine to reach to the line *x x*. C is a cylindrical block of wood, having a chamber filled with powder or gun-cotton, into which projects the lower end of a fuse, F, extending over the surface of the rock. The fuse floats in the nitrine, and the space above is filled, or partly filled, with water or sand. In the mode shown in Fig. 4, a percussion-cap, *a*, is secured to the end of the fuse F. In the third mode (shown in Fig. 5) the fuse terminates in a tube, *b*, filled with quick-powder or meal-powder, and a disk, *d*, of wood is used to prevent the sand-tamping *e* from falling into the nitrine. The charge is fired by igniting the fuse, which occasions the cartridge or cap at the lower end of the same to explode.

It will be understood that any source of heat applied so as to raise a particle of the nitrine confined in a chamber to its temperature of explosion (about 380° Fahrenheit) will be sufficient to cause the explosion of the entire charge. The cap causes the ignition and explosion of the nitrine chiefly by percussion or sudden pressure, the charge of powder chiefly by heat.

We claim as the invention of ALFRED NOBEL, and desire to secure by Letters Patent, as a new explosive compound—

The mode or process, substantially as herein described, of mixing together glycerine, sulphuric acid, and nitric acid, free, or nearly free, from hyponitric acid, for the purpose specified.

In testimony whereof we have signed our names to this specification before two subscribing witnesses.

TAL. P. SHAFFNER,
*President United States Blasting-Oil Company.*

JAMES DEVEAU,
*Secretary United States Blasting-Oil Company.*

Witnesses:
F. T. CHURCH,
A. R. RODGERS.